(12) United States Patent
Morris et al.

(10) Patent No.: US 10,113,433 B2
(45) Date of Patent: Oct. 30, 2018

(54) GAS TURBINE ENGINE COMPONENTS WITH LATERAL AND FORWARD SWEEP FILM COOLING HOLES

(71) Applicant: HONEYWELL INTERNATIONAL INC., Morristown, NJ (US)

(72) Inventors: Mark C. Morris, Phoenix, AZ (US); David Waldman, Chandler, AZ (US); Malak Fouad Malak, Tempe, AZ (US); Luis Tapia, Maricopa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1399 days.

(21) Appl. No.: 13/644,824

(22) Filed: Oct. 4, 2012

(65) Prior Publication Data
US 2014/0099189 A1    Apr. 10, 2014

(51) Int. Cl.
*F01D 5/18*    (2006.01)

(52) U.S. Cl.
CPC ........ *F01D 5/186* (2013.01); *F05D 2250/324* (2013.01); *F05D 2250/71* (2013.01); *F05D 2250/711* (2013.01); *F05D 2260/202* (2013.01); *Y02T 50/676* (2013.01)

(58) Field of Classification Search
CPC ................. F01D 5/186; F05D 2250/71; F05D 2250/711; F05D 2250/324; F05D 2260/202; Y02T 50/676
USPC ......................................................... 415/115
See application file for complete search history.

(56) References Cited

U.S. PATENT DOCUMENTS

| | | | |
|---|---|---|---|
| 4,461,612 A | 7/1984 | Dodd | |
| 4,526,358 A | 7/1985 | Ura et al. | |
| 4,529,358 A | 7/1985 | Papell | |
| 4,653,983 A | 3/1987 | Vehr | |
| 4,664,597 A | 5/1987 | Auxier et al. | |
| 4,684,323 A | 8/1987 | Field | |
| 4,729,799 A | 3/1988 | Henricks et al. | |
| 4,738,588 A * | 4/1988 | Field ....................... | F01D 5/186 415/115 |
| 5,062,768 A * | 11/1991 | Marriage ................ | F01D 5/186 29/889.721 |

(Continued)

FOREIGN PATENT DOCUMENTS

| | | |
|---|---|---|
| EP | 0375175 A1 | 11/1989 |
| EP | 0648918 A1 | 4/1995 |

(Continued)

OTHER PUBLICATIONS

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

(Continued)

*Primary Examiner* — Aaron R Eastman
(74) *Attorney, Agent, or Firm* — Lorenz & Kopf, LLP

(57) ABSTRACT

An engine component includes a body having an internal surface and an external surface, the internal surface at least partially defining an internal cooling circuit. The engine component further includes a plurality of cooling holes formed in the body and extending between the internal cooling circuit and the external surface of the body. The plurality of cooling holes includes a first cooling hole with forward diffusion and lateral diffusion.

12 Claims, 14 Drawing Sheets

(56) References Cited

U.S. PATENT DOCUMENTS

| | | | |
|---|---|---|---|
| 5,096,379 A | 3/1992 | Stroud et al. | |
| 5,261,223 A | 11/1993 | Foltz | |
| 5,281,084 A | 1/1994 | Noe et al. | |
| 5,382,133 A | 1/1995 | Moore et al. | |
| 5,403,156 A | 4/1995 | Arness et al. | |
| 5,465,572 A | 11/1995 | Nicoll et al. | |
| 5,496,151 A | 3/1996 | Coudray et al. | |
| 5,511,937 A | 4/1996 | Papageorgiou | |
| 5,609,779 A | 3/1997 | Crow et al. | |
| 5,683,600 A | 11/1997 | Kelley et al. | |
| 5,747,769 A | 5/1998 | Rockstroh et al. | |
| 6,183,199 B1 | 2/2001 | Beeck et al. | |
| 6,243,948 B1 | 6/2001 | Lee et al. | |
| 6,329,015 B1 | 12/2001 | Fehrenbach et al. | |
| 6,368,060 B1 | 4/2002 | Fehrenbach et al. | |
| 6,420,677 B1 | 7/2002 | Emer et al. | |
| 6,554,571 B1 | 4/2003 | Lee et al. | |
| 6,568,187 B1 | 5/2003 | Jorgensen et al. | |
| 6,607,355 B2 | 8/2003 | Cunha et al. | |
| 6,616,406 B2 | 9/2003 | Liang | |
| 6,979,176 B2 | 12/2005 | Nakamata et al. | |
| 6,984,100 B2 | 1/2006 | Bunker et al. | |
| 7,008,186 B2 | 3/2006 | Heeg et al. | |
| 7,052,233 B2 | 5/2006 | Fried et al. | |
| 7,131,814 B2 | 11/2006 | Nagler et al. | |
| 7,186,085 B2 | 3/2007 | Lee | |
| 7,186,091 B2 | 3/2007 | Lee et al. | |
| 7,246,992 B2 | 7/2007 | Lee | |
| 7,249,933 B2 | 7/2007 | Lee et al. | |
| 7,273,351 B2* | 9/2007 | Kopmels | F01D 5/186 416/97 R |
| 7,328,580 B2 | 2/2008 | Lee et al. | |
| 7,351,036 B2 | 4/2008 | Liang | |
| 7,374,401 B2 | 5/2008 | Lee | |
| 7,540,712 B1 | 6/2009 | Liang | |
| 7,563,073 B1 | 7/2009 | Liang | |
| 7,597,540 B1 | 10/2009 | Liang | |
| 7,625,180 B1 | 12/2009 | Liang | |
| 7,887,294 B1 | 2/2011 | Liang | |
| 7,901,181 B1 | 3/2011 | Liang | |
| 7,997,867 B1 | 8/2011 | Shih et al. | |
| 7,997,868 B1 | 8/2011 | Liang | |
| 8,057,179 B1 | 11/2011 | Liang | |
| 8,057,180 B1 | 11/2011 | Liang | |
| 8,057,181 B1 | 11/2011 | Liang | |
| 8,066,484 B1 | 11/2011 | Liang | |
| 8,245,519 B1 | 8/2012 | Liang | |
| 8,522,558 B1 | 9/2013 | Xu | |
| 8,529,193 B2 | 9/2013 | Venkataramanan et al. | |
| 8,572,983 B2 | 11/2013 | Xu | |
| 8,584,470 B2 | 11/2013 | Zelesky et al. | |
| 8,850,828 B2 | 10/2014 | Mongillo, Jr. et al. | |
| 8,857,055 B2 | 10/2014 | Wei et al. | |
| 8,961,136 B1 | 2/2015 | Liang | |
| 2005/0023249 A1 | 2/2005 | Kildea | |
| 2005/0042074 A1* | 2/2005 | Liang | F01D 5/186 415/115 |
| 2005/0135931 A1 | 6/2005 | Nakamata et al. | |
| 2005/0232768 A1 | 10/2005 | Heeg et al. | |
| 2005/0286998 A1* | 12/2005 | Lee | B23K 26/383 415/117 |
| 2006/0073015 A1 | 4/2006 | Liang | |
| 2006/0104807 A1 | 5/2006 | Lee | |
| 2006/0171807 A1 | 8/2006 | Lee | |
| 2006/0272335 A1 | 12/2006 | Schumacher et al. | |
| 2006/0277921 A1 | 12/2006 | Patel et al. | |
| 2007/0006588 A1 | 1/2007 | Patel et al. | |
| 2007/0128029 A1 | 6/2007 | Liang | |
| 2007/0234727 A1 | 10/2007 | Patel et al. | |
| 2008/0003096 A1* | 1/2008 | Kohli | F01D 5/186 415/115 |
| 2008/0005903 A1 | 1/2008 | Trindade et al. | |
| 2008/0031738 A1* | 2/2008 | Lee | F01D 5/18 416/97 R |
| 2008/0271457 A1 | 11/2008 | McMasters et al. | |
| 2009/0169394 A1 | 7/2009 | Crow et al. | |
| 2009/0246011 A1 | 10/2009 | Itzel | |
| 2010/0040459 A1* | 2/2010 | Ohkita | F01D 5/186 415/177 |
| 2010/0068032 A1* | 3/2010 | Liang | F01D 5/186 415/115 |
| 2010/0124484 A1 | 5/2010 | Tibbott et al. | |
| 2010/0303635 A1 | 12/2010 | Townes et al. | |
| 2011/0097188 A1 | 4/2011 | Bunker | |
| 2011/0097191 A1* | 4/2011 | Bunker | F01D 5/186 415/115 |
| 2011/0123312 A1 | 5/2011 | Venkataramanan et al. | |
| 2011/0176929 A1 | 7/2011 | Ammann et al. | |
| 2011/0217181 A1 | 9/2011 | Hada et al. | |
| 2011/0268584 A1 | 11/2011 | Mittendorf | |
| 2011/0293423 A1* | 12/2011 | Bunker | F01D 5/186 416/95 |
| 2011/0311369 A1* | 12/2011 | Ramachandran | F01D 5/186 416/97 R |
| 2012/0051941 A1 | 3/2012 | Bunker | |
| 2012/0102959 A1 | 5/2012 | Starkweather | |
| 2012/0167389 A1* | 7/2012 | Lacy | B23P 6/002 29/889.1 |
| 2013/0045106 A1 | 2/2013 | Lacy | |
| 2013/0115103 A1 | 5/2013 | Dutta et al. | |
| 2013/0209228 A1 | 8/2013 | Xu | |
| 2013/0209236 A1 | 8/2013 | Xu | |
| 2013/0315710 A1 | 11/2013 | Kollati et al. | |
| 2014/0208771 A1 | 7/2014 | Koonankeil et al. | |
| 2014/0294598 A1 | 10/2014 | Nita et al. | |
| 2014/0338347 A1 | 11/2014 | Gage et al. | |
| 2014/0338351 A1 | 11/2014 | Snyder et al. | |
| 2015/0226433 A1 | 8/2015 | Dudebout et al. | |
| 2015/0369487 A1 | 12/2015 | Dierberger | |

FOREIGN PATENT DOCUMENTS

| | | |
|---|---|---|
| EP | 0924382 A2 | 6/1999 |
| EP | 0924384 A2 | 6/1999 |
| EP | 0992653 A1 | 4/2000 |
| EP | 1609949 A1 | 12/2005 |
| EP | 1892375 A1 | 2/2008 |
| EP | 1942251 A2 | 7/2008 |
| EP | 1970628 A2 | 9/2008 |
| EP | 2027963 A1 | 2/2009 |
| EP | 2666964 A2 | 11/2013 |
| EP | 2713010 A1 | 4/2014 |
| EP | 2815098 A1 | 12/2014 |
| EP | 2937513 A2 | 10/2015 |
| EP | 2985417 A1 | 2/2016 |
| EP | 3199762 A1 | 8/2017 |
| JP | 07332005 | 12/1995 |
| JP | 2001012204 | 1/2001 |
| JP | 2006307842 | 11/2006 |
| JP | 2008248733 A | 10/2008 |
| WO | 2013133913 A1 | 8/2013 |
| WO | 2013/165502 A2 | 11/2013 |
| WO | 2013/165509 A2 | 11/2013 |
| WO | 2013165504 A2 | 11/2013 |

OTHER PUBLICATIONS

Loh, Teck Seng; Srigrarom, Sutthiphong; Investigative Study of Heat Transfer and Blades Cooling in the Gas Turbine, Modern Physics Letters B, vol. 19, Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4,441 (13 pages).

Shih, T. I.-P., NA, S.; Momentum-Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Heidmann et al., A Novel Antivortex Turbine Film-Cooling Hole Concept, Journal of Turbomachinery, 2008 by ASME, Jul. 2008, vol. 130, pp. 031020-1-031020-9.

(56) References Cited

OTHER PUBLICATIONS

Colban, W., Thole, K.; Influence of Hole Shape on the Performance of a Turbine Vane Endwall Film-cooling Scheme, International Journal of Heat and Fluid Flow 28 (2007), pp. 341-356.
Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.
Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006, Barcelona, Spain, vol. 3: Heat Transfer, Parts A and B, No. GT2006-90108, pp. 103-116.
Lu, Y., Allison, D., Ekkad, S. V.: Influence of Hole Angle and Shaping on Leading Edge Showerhead Film Cooling, ASME Turbo Expo 2006: Power for Land, Sea, and Air (GT2006), May 8-11, 2006, Barcelona, Spain, vol. 3: Heat Transfer, Parts A and B, No. GT2006-90370 pp. 375-382.
USPTO Office Action for U.S. Appl. No. 13/477,883 dated Feb. 9, 2015.
USPTO Office Action for U.S. Appl. No. 13/465,647 dated Apr. 22, 2015.
USPTO Office Action, Notification Date; Oct. 3, 2014; U.S. Appl. No. 13/477,883.
EP Communication for EP 13 165 798.3-1610 dated Apr. 24, 2015.
EP Search Report for Application No. EP 13157092.1 Dated Jul. 10, 2015.
EP Examination Report for Application No. EP 13157092.1 Dated Jul. 21, 2015.
Lu, Yiping, "Effect of Hole Configurations on Film Cooling from Cylindrical Inclined Holes for the Application to Gas Turbine Blades", A Dissertation, Submitted to the Graduate Faculty of the Louisiana State University and Agricultural and Mechanical College, Dec. 2007, Baton Rouge, Louisiana.
EP Search Report for Application 13177511.6 dated Sep. 26, 2014.
EP Search Report, EP10187079.8-2321 dated Feb. 4, 2011.
Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.
Wayne et al., High-Resolution Film Cooling Effectiveness Comparison of Axial and Compound Angle Holes on the Suction Side of a Turbine Vane, Transactions of the ASME, pp. 202-211, Copyright 2007 by ASME.
Lu et al., Turbine Blade Showerhead Film Cooling: Influence of Hole Angle and Shaping, International Journal of Heat and Fluid Flow 28 (2007) pp. 922-931.
Kim et al., Influence of Shaped Injection Holes on Turbine Blade Leading Edge Film Cooling, International Journal of Heat and Mass Transfer 47 (2004) pp. 245-256.
EP Examination Report for Application 13177511.6; dated Oct. 15, 2014.
USPTO Office Action, Notification Date Dec. 17, 2015; U.S. Appl. No. 13/477,883.
Wos, F.J.; Laser Hole-Shaping Improves Combustion Turbine Efficiency; May 1, 2010.
USPTO Final Office Action, Notification Date Aug. 25, 2015; U.S. Appl. No. 13/465,647.
USPTO Office Action, Notification dated Mar. 1, 2016; U.S. Appl. No. 13/465,647.
Extended EP Search Report for Application No. 17167172.0-1610 dated Feb. 11, 2017.
EP Examination Report for Application No. 13 157 092.1-1610 dated Sep. 22, 2017.
USPTO Office Action for U.S. Appl. No. 13/477,883 dated Aug. 25, 2017.
EP Examination Report for Application No. 13177511.6 dated Mar. 23, 2018.

* cited by examiner

GAS TURBINE ENGINE COMPONENTS WITH LATERAL AND FORWARD SWEEP FILM COOLING HOLES

STATEMENT REGARDING FEDERALLY SPONSORED RESEARCH OR DEVELOPMENT

This invention was made with support under DTFAWA-10-C-00040 awarded by the U.S. Government. The U.S. Government has certain rights in this invention.

TECHNICAL FIELD

The present invention generally relates to gas turbine engines, and more particularly relates to air cooled components of gas turbine engines, such as turbine and combustor components.

BACKGROUND

Gas turbine engines are used in a wide range of applications, such as aircraft engines and auxiliary power units. In a gas turbine engine, air is compressed in a compressor and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. The hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades and stator vanes in order to prevent damage and extend useful life. One mechanism for cooling turbine airfoils is to duct cooling air through internal passages and then vent the cooling air through holes formed in the airfoil. The holes are typically formed uniformly along a line substantially parallel to the leading edge of the airfoil and at selected distances from the leading edge to provide a film of cooling air over the convex side of the airfoil. Other rows of cooling holes or an array of holes may be formed in the airfoil components depending upon design constraints. In some instances, the cooling of engine components in an efficient and effective manner remains a challenge.

Accordingly, it is desirable to provide a gas turbine engine with components having improved film cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine component includes a body having an internal surface and an external surface, the internal surface at least partially defining an internal cooling circuit. The engine component further includes a plurality of cooling holes formed in the body and extending between the internal cooling circuit and the external surface of the body. The plurality of cooling holes includes a first cooling hole with forward diffusion and lateral diffusion.

In accordance with another exemplary embodiment, a turbine section of a gas turbine engine includes a housing defining a hot gas flow path; a plurality of circumferential rows of airfoils disposed in the hot gas flow path, the plurality of airfoils including a first airfoil having an interior surface forming an internal cooling cavity and an exterior surface exposed to the hot gas flow path; and a plurality of cooling holes formed in the first airfoil and extending between the internal cooling circuit and the external surface of the first airfoil. The plurality of cooling holes includes a first cooling hole with forward diffusion and lateral diffusion. The first cooling hole includes an inlet at the internal cooling circuit, a metering section extending from the inlet, a first exit portion extending from the metering section, a second exit portion extending from the first exit portion, and an outlet defined on the external surface and fluidly coupled to the second exit portion

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved film cooling. The turbine components have a number of cooling holes that are both laterally and forward diffused. Particularly, the exit portions of the cooling holes may have portions with increasing forward angles and/or decreasing forward radii of curvature. The cooling holes may include lateral diffusion characteristics such as side edges with increasing angles and/or multi-lobed shapes. In some embodiments, the cooling holes may be metered with oval-shaped cylindrical sections.

Figure 1:
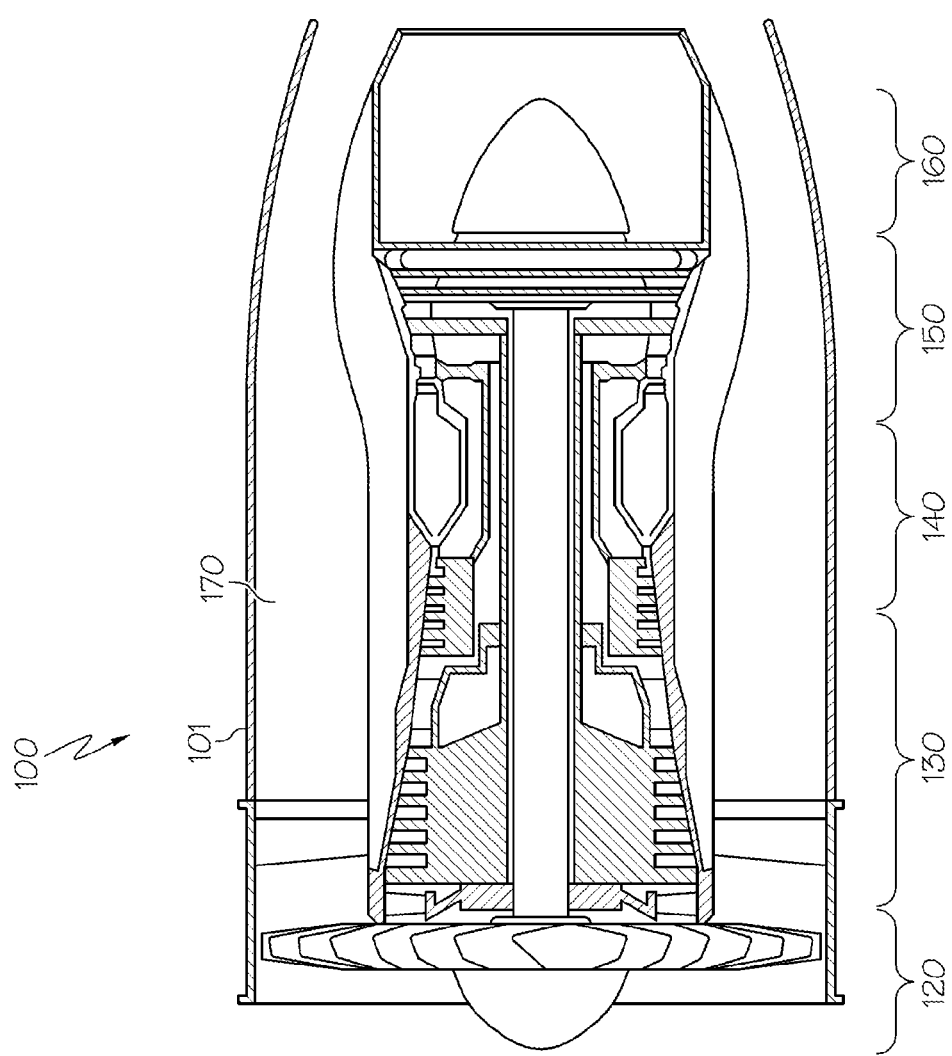
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
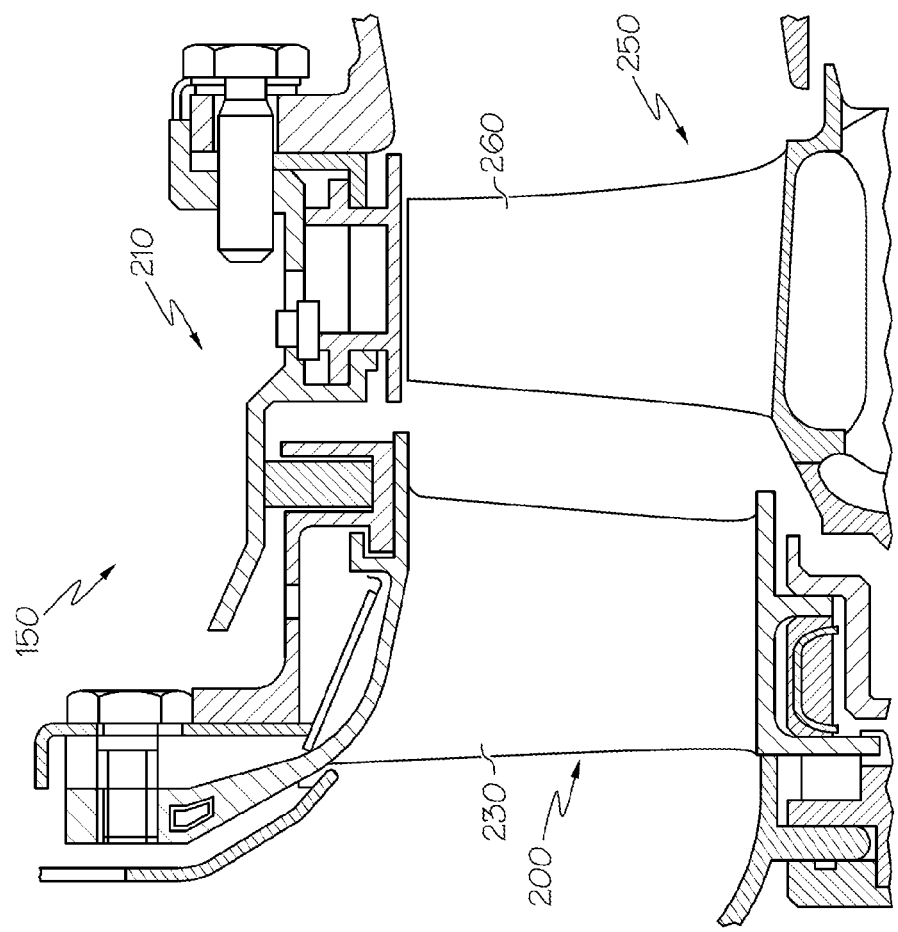
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1, in accordance with an exemplary embodiment. The turbine section 150 includes a turbine stator assembly 200 and a turbine rotor assembly 250 surrounded by a shroud 210 defining a gas flow path through which hot, combusted air from an upstream combustor section (e.g. combustion section 140 of FIG. 1) is directed. Although only one turbine stator assembly 200 and one turbine rotor assembly 250 are shown, such stator assemblies 200 and rotor assemblies 250 are typically arranged in alternating axially spaced, circumferential rows. As used herein, the term "axial" refers to a direction generally parallel to the engine centerline, while the term "radial" refers to a direction generally perpendicular to the engine centerline.

The rotor assembly 250 generally includes rotor blades (or airfoils) 260 (one of which is shown) mounted on a rotor disc (not shown), which in turn is coupled to an engine shaft (not shown). The turbine stator assembly 200 includes stator vanes (or airfoils) 230 (one of which is shown) that direct the air toward the rotor assembly 250. The air impinges upon rotor blades 260 of the rotor assembly 250, thereby driving the rotor assembly 250 for power extraction. To allow the turbine section 150 to operate at desirable elevated temperatures, certain components are cooled. For example, a supply of cooling air, typically obtained as a bleed flow from the compressor (not shown), may pass through internal cooling circuits, and then may pass through cooling holes in the stator assemblies 200 and rotor assemblies 250 to form surface cooling film. Although the cooling mechanisms are discussed with reference to turbine components, the cooling mechanisms may also be incorporated into other engine components, such as compressor components. The cooling mechanisms are discussed in greater detail below.

Figure 3:
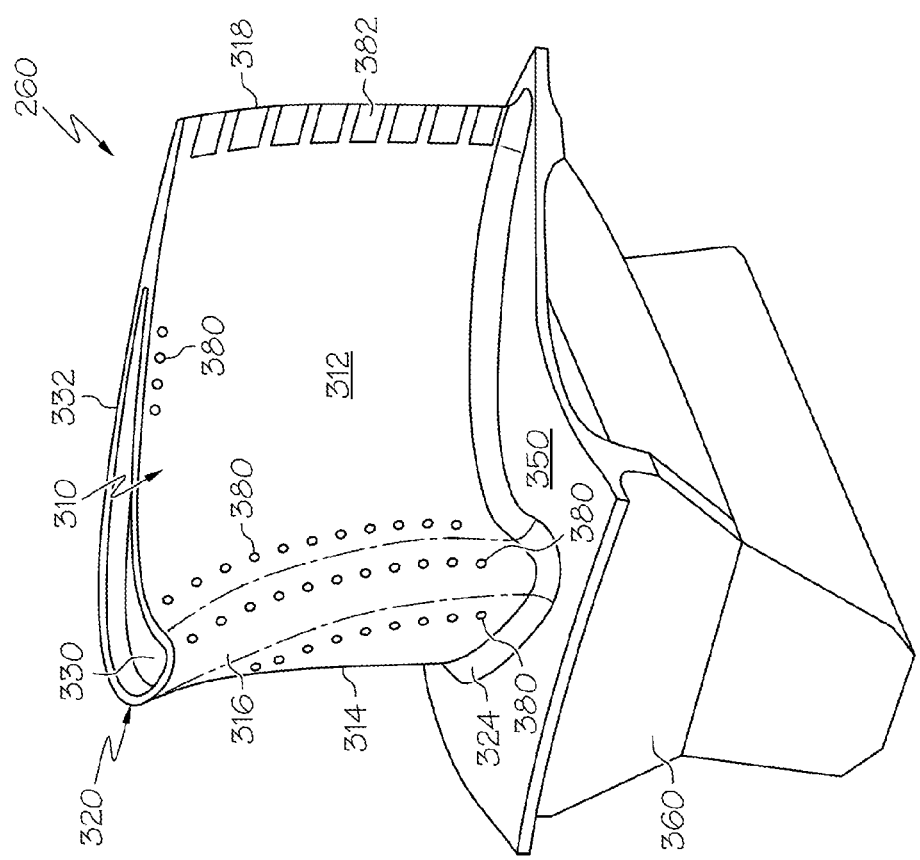
FIG. 3 is an isometric view of a turbine rotor blade of the turbine section of FIG. 2 in accordance with an exemplary embodiment.

FIG. 3 illustrates an exemplary turbine rotor blade, such as rotor blade 260 of FIG. 2, removed from a turbine section. FIG. 3 depicts one exemplary embodiment, and other exemplary embodiments may have alternate configurations or arrangements. Aspects of the rotor blade 260 may also be applicable to the rotor vane 230 (FIG. 2), particularly the cooling mechanisms.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the rotor blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials such as SC180 or CMSX4, steels, titanium alloys or the like. In various embodiments, the rotor blade 260 may be manufactured by casting, molding, and/or additive manufacturing techniques.

The airfoil 310 projects radially outward from the platform 350. The airfoil 310 has two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 includes trailing edge slots 382, discussed below.

In an axial direction, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction. The blade tip 320 is formed by a tip cap 330 and squealer tip extensions 332. The tip cap 330 extends between the side walls 312, 314, typically from leading edge 316 to trailing edge 318. In some exemplary embodiments, the tip cap 330 is recessed relative to the squealer tip extensions 332, which are formed by side walls 312, 314 extending radially beyond the tip cap 330. The tip cap 330 and squealer tip extensions 332 may be designed to minimize the leakage of hot gasses over the blade tip 320 of the rotor blade 260.

As noted above, the rotor blade 260, particularly the airfoil 310, is subject to extremely high temperatures resulting from high velocity hot gases ducted from the combustion section 140 (FIG. 1). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, in the area of the leading edge 316, and in areas immediately aft of the leading edge 316, although film cooling holes 380 may be provided in other locations. The locations of the film cooling holes 380 are schematically shown, but the particular shapes and configurations of exemplary film cooling holes will be discussed in greater detail below.

Figure 4:
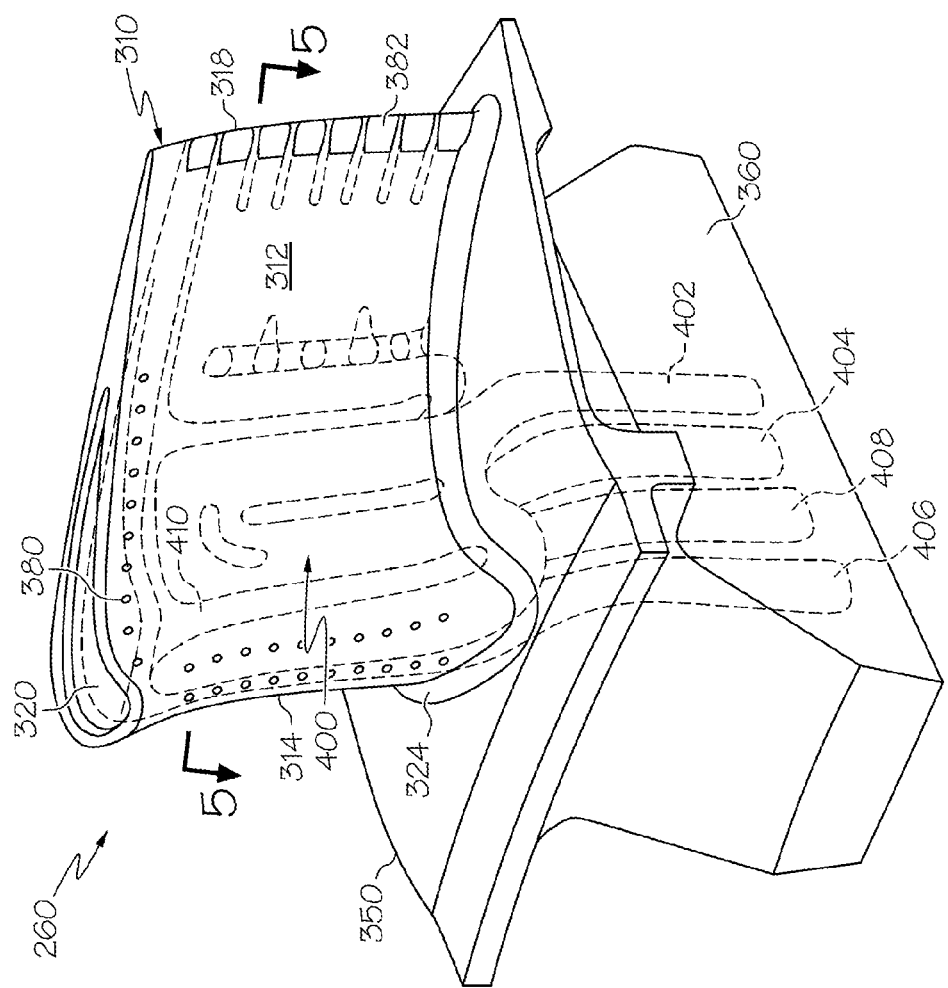
FIG. 4 is an isometric view of the turbine rotor blade of FIG. 3 schematically showing an internal cooling circuit in accordance with an exemplary embodiment.

FIG. 4 is an isometric view of the rotor blade 260 and particularly shows an outline of an internal cooling circuit 400 formed therein. The internal cooling circuit 400 is configured to cool the first side wall 312, second side wall 314, and blade tip 320 by directing air from an inlet formed in the root 360 to the trailing edge slots 382 and/or cooling holes 380. The internal cooling circuit 400 is made up of a plurality of flow circuit portions, including a pressure side flow circuit portion 402, a suction side flow circuit portion 404, a tip flow circuit portion 406, and a center flow circuit portion 408. The pressure side flow circuit portion 402 directs air from the root 360 along the first side wall 312. The suction side flow circuit 404 receives air from the root 360 and directs the air along the suction side wall 314. The tip flow circuit portion 406 receives air from the suction side flow circuit portion 404 and the center flow circuit portion 408 and directs the air along the blade tip 320. The center flow circuit portion 408 takes air from the root 360 and cools internal walls, e.g. walls 410, that also partially define the other flow circuit portions 402, 404, 406. The internal cooling circuit 400 is merely one exemplary configuration and generally corresponds to a high effectiveness cooled turbine blade or vane. Other types and configurations of cooling circuits may be provided, including more integrated or isolated cooling circuits, to optimize flow and heat transfer characteristics of the flow circuit 400. Various pins, cross-over holes, turning vanes, turbulators, depressions, and accelerators may be provided in the internal cooling circuit 400 as necessary or desired.

Figure 5:
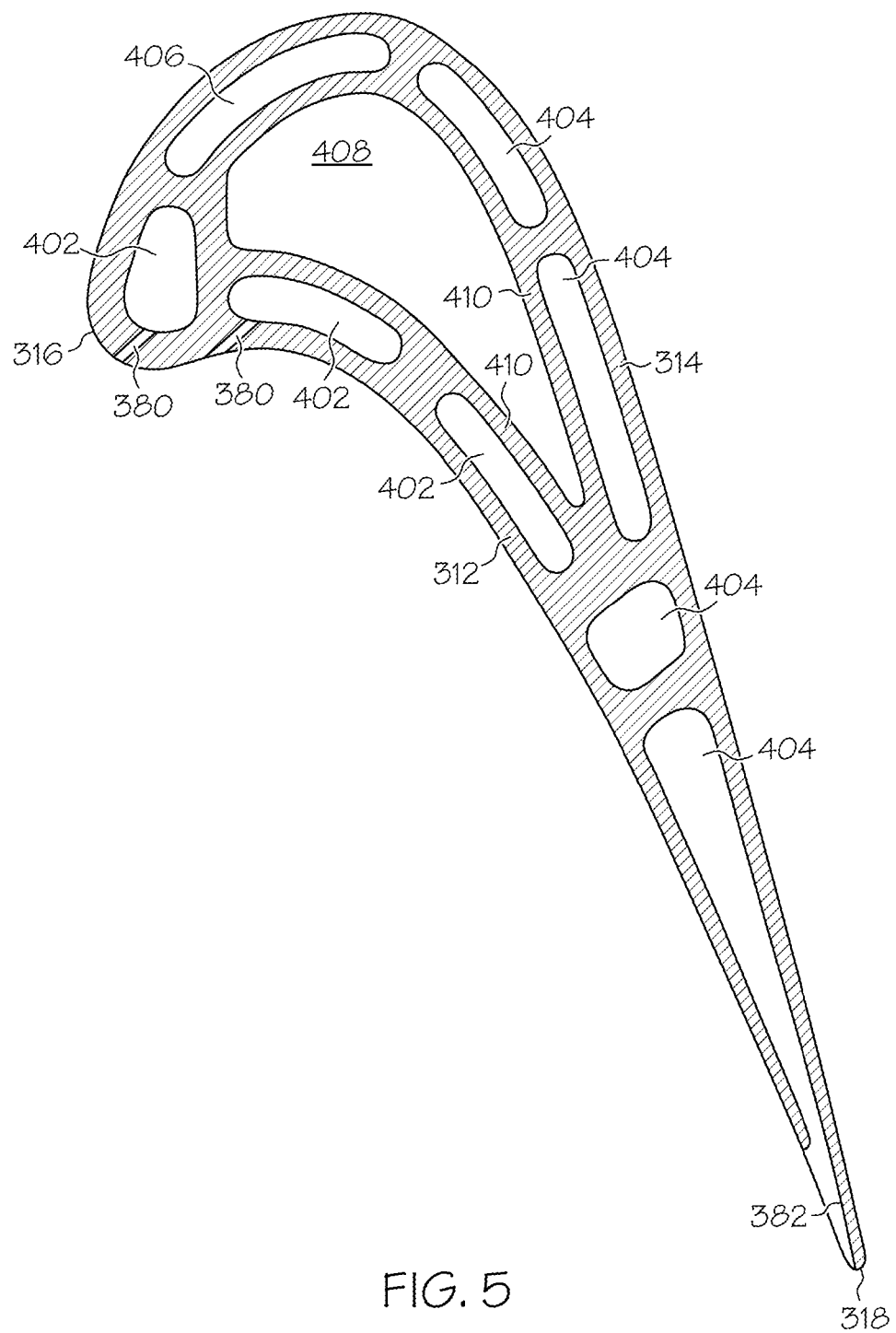
FIG. 5 is a cross-sectional view of an airfoil of the turbine rotor blade taken along lines 5-5 of FIG. 4 in accordance with an exemplary embodiment.

Accordingly, the internal cooling circuit 400 forms a number of internal passages and segments through the interior of the rotor blade 260. As an example, FIG. 5 is a cross-sectional view of the rotor blade 260 through line 5-5 of FIG. 4. FIG. 5 particularly shows portions of the side walls 312, 314; leading edge 316; trailing edge 318; trailing edge slot 382; pressure side flow circuit portion 402; suction side flow circuit portion 404; tip flow circuit portion 406; center flow circuit portion 408; and internal walls 410. As noted above, the cooling air flows through the circuit portions 402, 404, 406, 408 and exits through trailing edge slots 382. Additionally, the air may exit through the film cooling holes 380, examples of which are described in greater detail below with reference to FIGS. 6-14.

Figure 6:
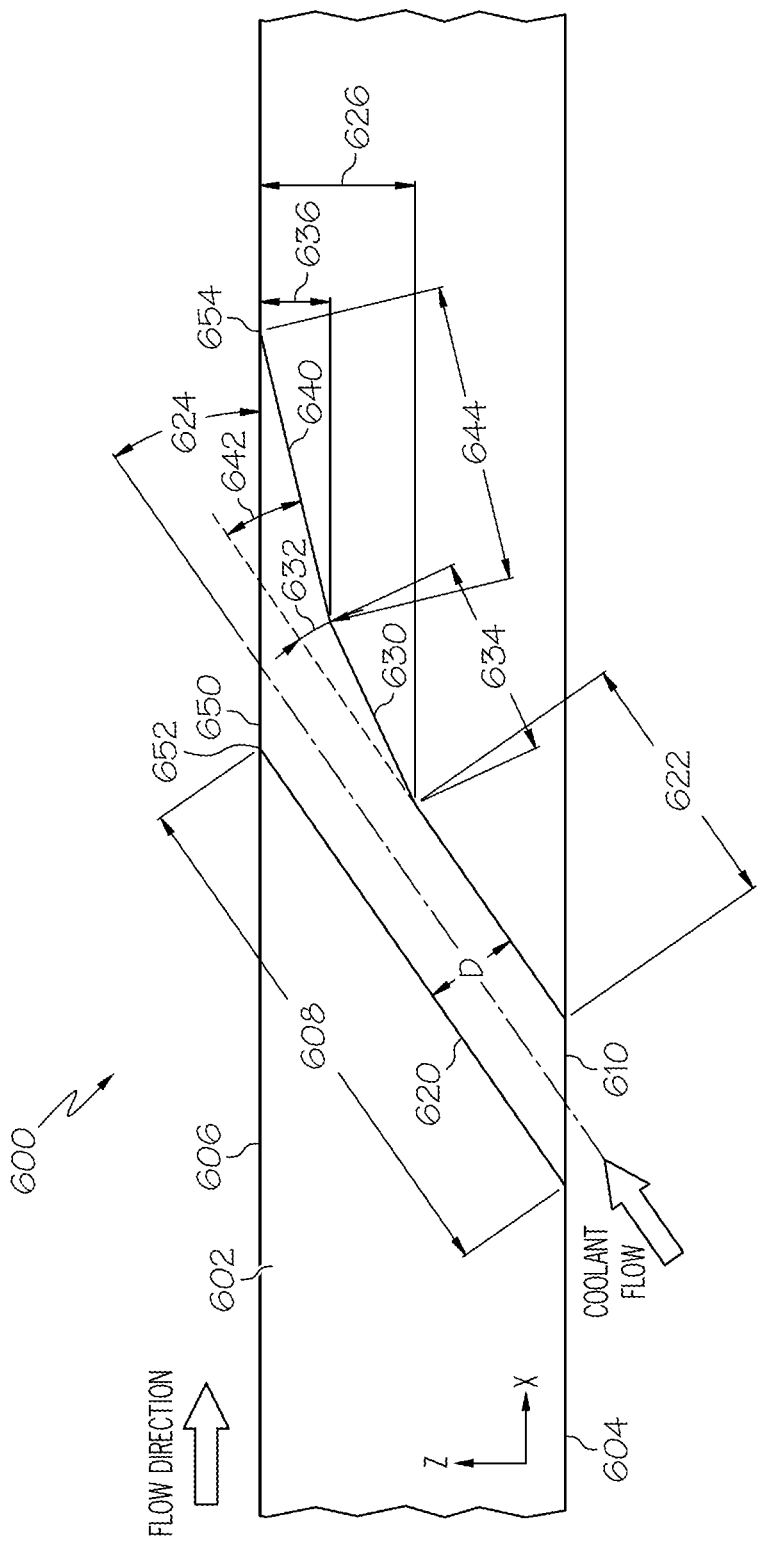
FIG. 6 is a cross-sectional view of a cooling hole in accordance with an exemplary embodiment.

FIG. 6 is a cross-sectional view of a cooling hole 600, which may correspond to the cooling holes 380 discussed above, although cooling hole 600 may represent a cooling hole in any engine component. The cooling hole 600 extends through a wall 602 (e.g., wall 312 or 314 of FIG. 5) between an inner surface 604 and an outer surface 606 at a longitudinal length 608. The inner surface 604 forms a portion of a cooling circuit (e.g., circuit 400 of FIG. 4) to receive cooling flow, and the outer surface 606 is exposed to the mainstream hot gas flow.

Generally, the cooing hole 600 includes an inlet 610, a relatively straight metering portion 620, a first exit portion 630, a second exit portion 640, and an outlet 650. The inlet 610 may be any suitable shape, such as oval, and defined in the inner surface 604. The metering portion 620 extends from the inlet 610 and may have a size, shape, and length to meter the appropriate amount of cooling air through the hole 600. In one exemplary embodiment, the metering portion 620 may be an oval-shaped cylinder with a length 622. As an example, the metering portion 620 may be oval with a minor diameter of approximately 0.015 inches and a major diameter of approximately 0.020 inches. In general, the metering portion 620 may have any suitable cross-sectional diameter(s). The ratio of the length 622 to hole diameter of metering portion 620 is typically 0.5 to 4.0. In other embodiments, the ratio may be smaller than 0.5 or larger than 4.0 and is determined by the specific configuration of the design.

The metering portion 620 may be inclined relative to the outer surface 606 at any suitable angle 624 and extend to any suitable depth, e.g., from the inner surface 604 to a depth 626 from the outer surface 606. In one exemplary embodiment, the metering portion 620 may be inclined relative to the inner surface 604 at an angle of 20°-35°, as examples.

The first exit portion 630 extends from the metering portion 620. The first exit portion 630 may have any suitable shape, including the shapes described in greater detail below. The first exit portion 630 extends at an angle 632 relative to the metering portion 620 at a length 634, e.g. from the depth 626 of the metering portion 620 to depth 636 relative to the outer surface 606. The second exit portion 640 extends from the first exit portion 630. The second exit portion 640 may have any suitable shape, including the shapes described in greater detail below. The second exit portion 640 extends at an angle 642 relative to the metering portion 620 at a length 644, e.g., from the depth 636 to the outer surface 606. Additional details about the shape of the exit portions 630, 640 are provided below. The ratio of the length 630 to hole diameter of metering portion 620 is typically 1.0 to 4.0, and the ratio of the length 640 to hole diameter of metering portion 620 is typically 2.0 to 10.0, where the optimal ratios are determined by the specific configuration of the design. In other embodiments, the ratios may be smaller or larger.

Like the first and second exit portions 630, 640, the outlet 650 may have any suitable shape, including the shapes described in greater detail below. The outlet 650 may be considered to have a leading edge 652 and a trailing edge 654, which generally refer to the orientation of the hole 600 relative to mainstream gas flow.

As shown in FIG. 6, the angle 642 of the second exit portion 640 is greater that the angle 632 of the first exit portion 630 such that the hole 600 may be considered to have a forward sweep configuration. Although the hole 600 has two, generally increasing angled portions (e.g., angles 632 and 642), other exemplary embodiments may have additional exit portions with further increasing angles. In one exemplary embodiment, the angle 632 of the first exit portion 630 is about 20° and the angle 642 of the second exit portion 640 is about 40°. In another exemplary embodiment, the angle 632 of the first exit portion 630 is about 10° and the angle 642 of the second exit portion 640 is about 20°. In a further embodiment, the angle 642 of the second exit portion 640 may be at least twice as much as the angle 632 of the first exit portion 630.

As additionally shown in FIG. 6, the first and second exit portions 630, 640 are generally straight portions. In other exemplary embodiments, the first and second exit portions 630, 640 may be other shapes, including curved. For example, the first and second exit portions 630, 640 may be a continuously curved portion with a constant or varied radius of curvature, such as a decreasing radius of curvature. For example, the first exit portion 630 may have a first radius of curvature and the second exit portion 640 may have a second radius of curvature that is less than the first radius of curvature. In other embodiments, the first exit portion 630 may have a first radius of curvature and the second exit portion 640 may have a second radius of curvature that is greater than the first radius of curvature to enable compatibility with internal cooling features, as described below.

Figure 7:
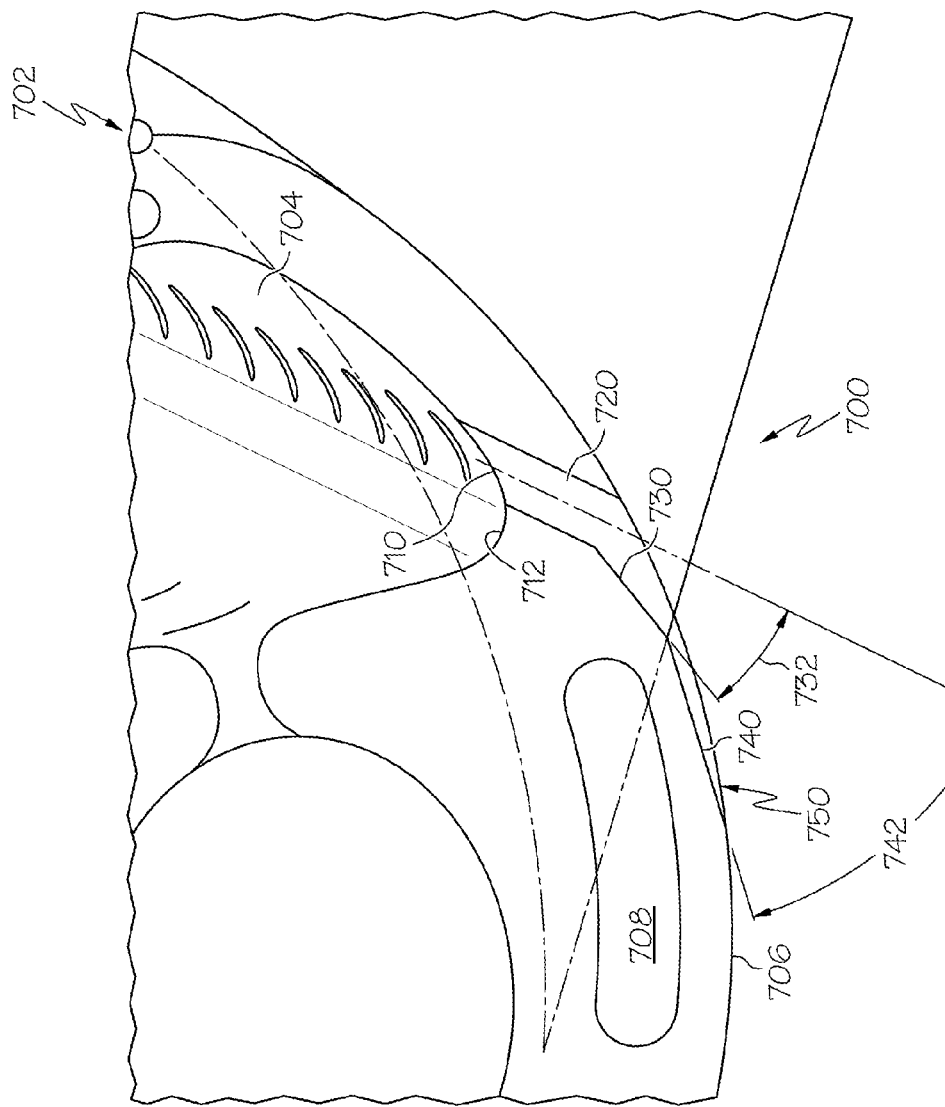
FIG. 7 is a cross-sectional view of a portion of an airfoil in accordance with an exemplary embodiment.

In some embodiments, increasing the angle of the second exit portion 640 relative to the first exit portion 630 enables the placement of cooling flow in areas that may have been previously unavailable for cooling. For example, FIG. 7 is a cross-sectional view of a cooling hole 700, similar to the cooling hole 600 of FIG. 6, incorporated into an airfoil 702. As above, the cooing hole 700 includes an inlet 710, a relatively straight metering portion 720, a first exit portion 730, a second exit portion 740, and an outlet 750. The inlet 710 may be any suitable shape, such as oval, and receives cooling air flow from cavity (or circuit portion) 704. The metering portion 720 extends from the inlet 710 and may function to meter the appropriate amount of cooling air through the hole 700. The first exit portion 730 extends from the metering portion 720 at a first angle 732, and the second exit portion 740 extends from the first exit portion 730 at a second angle 742 relative to the metering portion 720. As a result of the angles 732, 742, the cooling hole 700 is configured to provide cooling air to a location (e.g., location 706) that is a relatively large distance from the cavity 704, which may be an area that may otherwise be difficult to cool. For example, because of metering, air flow considerations, or source issues, it may be otherwise difficult to provide cooling air from a closer cavity (e.g., cavity 708) to location 706. Similarly, without angles 732, 742, it would be difficult to provide cooling air from cavity 704 to location 706, e.g., cavity 708 may otherwise impede or prevent a direct cooling hole or a simple compound cooling hole from delivering cooling air flow directly to location 706. In addition, utilization of the multi-forward angle swept cooling hole 700 allows the inlet 710 to be moved away from the high stressed fillet 712.

Figure 8:
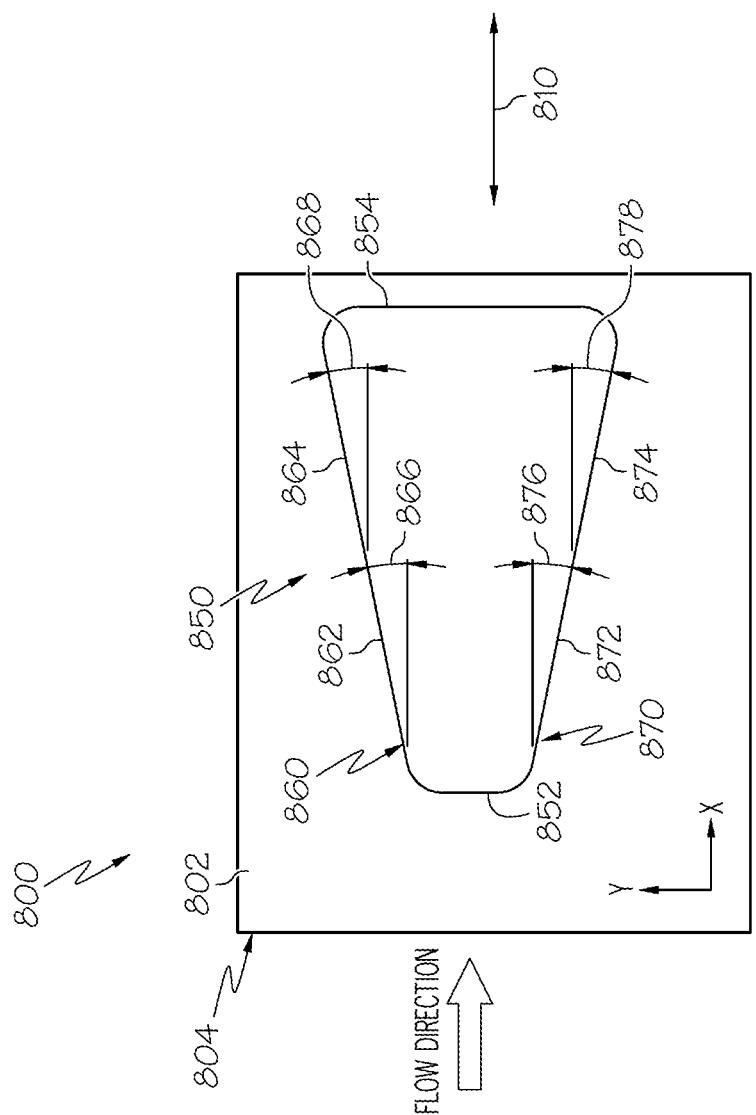
FIG. 8 is an outer surface view of a cooling hole in accordance with an exemplary embodiment.

As noted above, the exit portions of the cooling holes (e.g., outlets 650, 750 of FIGS. 6 and 7) discussed above may have any suitable shape or configuration. One exemplary embodiment is illustrated in FIG. 8. FIG. 8 is a top or external view of an outlet 850 of a cooling hole 800 on an outer surface 802 of an airfoil 804. Unless otherwise noted, the cooling hole 800 may have a configuration such as the exemplary embodiments discussed above, and may be formed in a rotor assembly, stator assembly, and/or compressor component.

The outlet 850 of the cooling hole 800 may have a leading edge 852, a trailing edge 854, a first side 860, and a second side 870. In this exemplary embodiment, the leading edge 852 and trailing edge 854 are relatively straight and parallel to one another. The first and second sides 860 and 870 are generally symmetric about a surface longitudinal axis 810.

The first side 860 may be formed by one or more portions, including a leading portion 862 extending from the leading edge 852 and a trailing portion 864 extending from the leading portion 862 to the trailing edge 854. The leading portion 862 is oriented at a first angle 866 relative to the longitudinal axis 810, and the trailing portion 864 is oriented at a second angle 868 relative to the longitudinal axis 810. Similarly, the second side 870 has a leading portion 872 extending from the leading edge 852 and a trailing portion 874 extending from the leading portion 872 to the trailing edge 854. The leading portion 872 is oriented at a first angle 876 relative to the longitudinal axis 810, and the trailing portion 874 is oriented at a second angle 878 relative to the longitudinal axis 810. As noted above, the first and second sides 860, 870 are generally symmetric in this exemplary embodiment, such that the first angles 866, 876 are equal to one another (e.g., as an absolute value) relative to the longitudinal axis 810 and the second angles 868, 878 are equal to one another (e.g., as an absolute value) relative to the longitudinal axis 810. In other exemplary embodiments, the first and second sides 860, 870 may be asymmetric.

In general, the second angles 868, 878 are greater than the first angles 866, 876. As a result of this arrangement, each of the first and second sides 860 and 870 has a lateral sweep or spread. In one exemplary embodiment, the first angles 866, 876 may be, for example, 10°-12° and the second angles 868, 878 may be, for example, 13°-15°, although any combination of angles may be provided.

In some exemplary embodiments and now referring to FIGS. 6 and 8, the configuration of holes 600, 800 may be referred to as "double-diffused" as a result of forward diffusion (e.g., such as that resulting from the angles 632, 642 of the first and second exit portions 630, 640 in FIG. 6) and as a result of lateral diffusion (e.g., such as that resulting from angles 866, 868, 876, 878 of the first and second sides 860, 870). The double-diffused arrangement may provide advantageous cooling flow characteristics. As described in further detail below, the double-diffused configurations may have alternate configurations.

Figure 9:
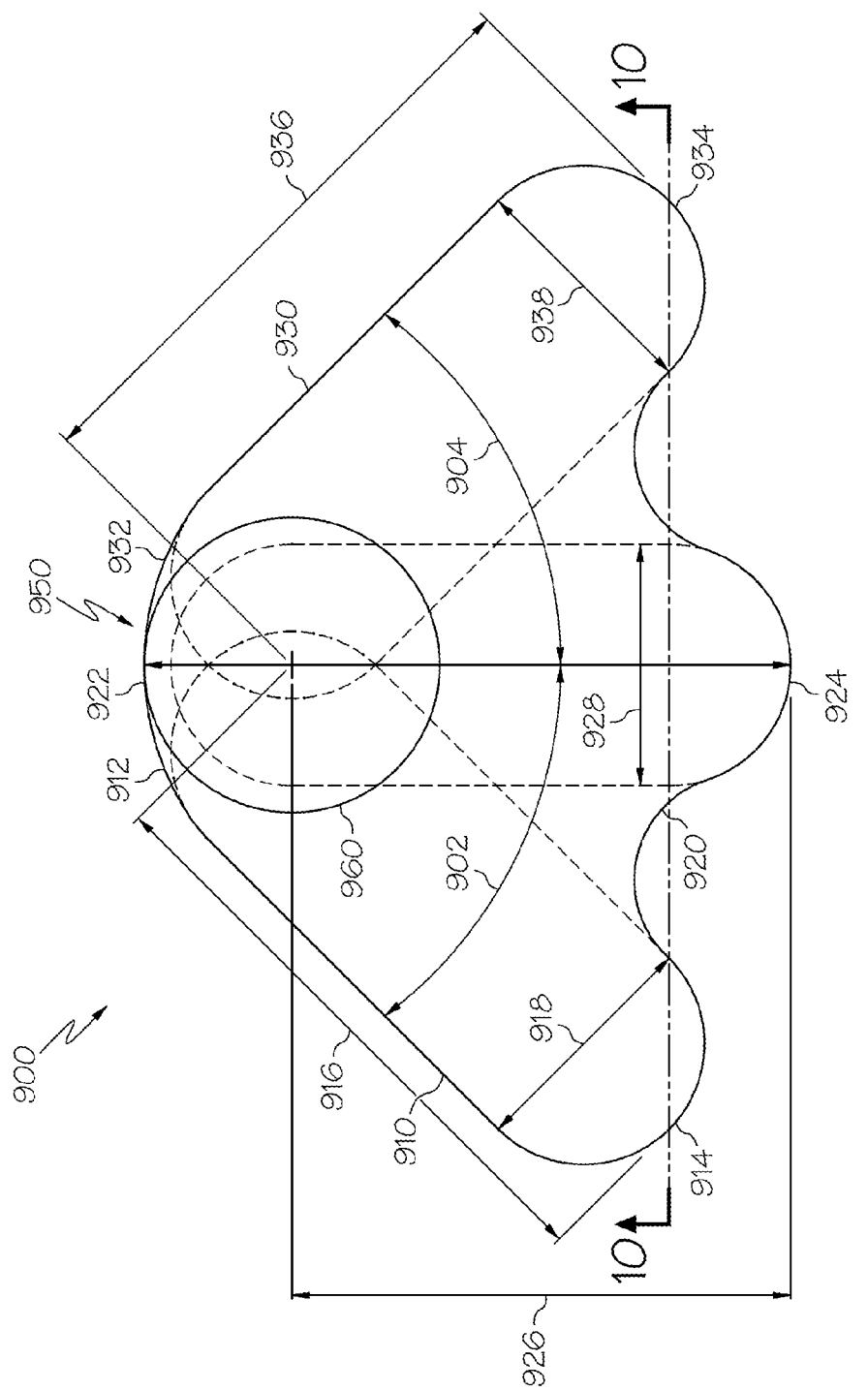
FIG. 9 is an outer surface view of a cooling hole in accordance with an exemplary embodiment.
Figure 10:
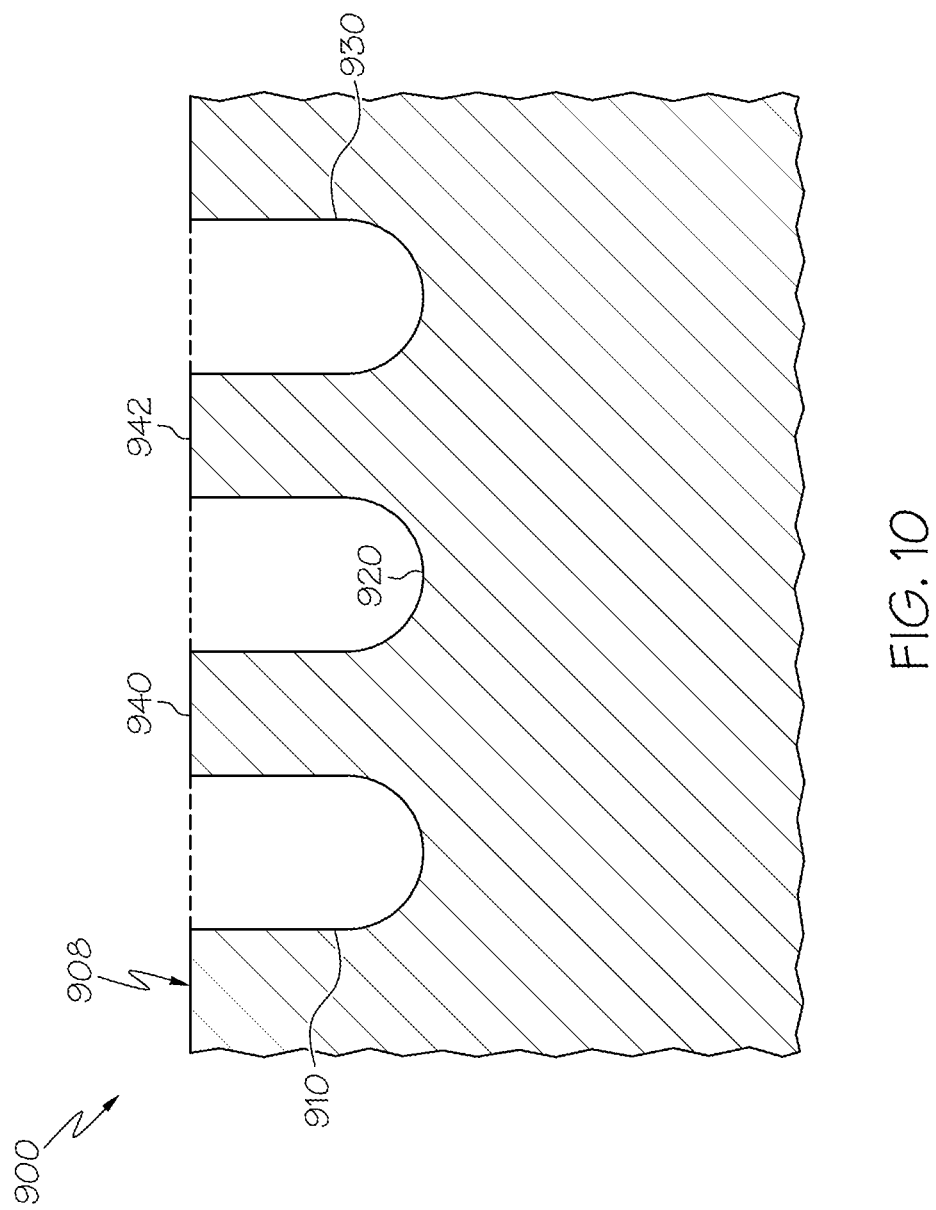
FIG. 10 is a cross-sectional view of the cooling hole through line 10-10 of FIG. 9 in accordance with an exemplary embodiment.

FIGS. 9 and 10 are views of a cooling hole 900 according to an exemplary embodiment. In particular, FIG. 9 is a top or outer surface view of the cooling hole 900 in accordance with an exemplary embodiment, and FIG. 10 is a cross-sectional view of the cooling hole 900 through line 10-10 of FIG. 9.

Unless otherwise noted, the cooling hole 900 has a similar configuration to the cooling hole 600 depicted in FIG. 6. As such, the cooling hole 900 may be considered to have a relatively straight interior metering portion (e.g., such as portion 620 of FIG. 6) that transitions into the exit portions (e.g., such as exit portions 630, 640 and outlet 650). In general, the metering portion may be oval shaped or any other suitable shape. In one exemplary embodiment, the exit portions transition from the oval interior portion to the outlet 950 depicted by the surface view of FIG. 9. In other words, the exit portions may have shape similar to that of outlet 950, although with a size and configuration that gradually transitions from the oval interior portion to the outlet 950. In some exemplary embodiments, the exit portions of hole 900 may have a forward sweep such as that described with reference to FIG. 6.

Referring to FIGS. 9 and 10, the outlet 950 of cooling hole 900 will now be described. In one exemplary embodiment, the outlet 950 of cooling hole 900 is tri-lobed, e.g., the outlet 950 is generally formed by a first lobe 910, a second lobe 920, and a third lobe 930 extending from a circular, oval or otherwise cylindrical portion 960. The center of the cylindrical portion 960 generally corresponds to the interior longitudinal axis of the cooling hole 900.

As shown, each lobe 910, 920, 930 may be oval shaped. In some embodiments, such an oval shape may be considered an ellipsis or a curved rectangle. Each of the lobes 910, 920, 930 has a first end 912, 922, 932 and a second end 914, 924, 934. The first ends 912, 922, 932 are generally coincident, e.g., the foci of each of the first ends 912, 922, 932 are generally aligned, or at least partially overlap with respect to one another. The first and second ends 912, 922, 932; 914, 924, 934 may be any suitable shape, including semi-circular. Moreover, the first and second ends 912, 922, 932; 914, 924, 934 may have the same or different shapes. In one exemplary embodiment, the first and second ends 912, 922, 932; 914, 924, 934 are semi-circular with a radius of curvature of about 0.0065 inches.

The second ends 914, 924, 934 may be considered splayed such that the lobes 910, 920, 930 are angled relative to one another. As such, the tri-lobed shape of the cooling hole 900 may also be considered "W-shaped," "three-prong shaped," or "tri-wing shaped." Generally, the cooling hole 900 may be referred to as "multi-lobed" with three or more lobes. Considering that the upstream portion of the cooling hole 900 is oval and the downstream portion, as shown in FIG. 9, is multi-lobed, the cooling hole 900 may be considered to have an oval to multi-lobe (OTML) configuration.

The cooling hole 900 may be arranged relative to the mainstream gas flow. In one exemplary embodiment, the cooling hole 900 may be arranged such that the second lobe 910 is parallel to the mainstream gas flow, e.g., such that the first ends 912, 922, 932 form a leading edge and the lobes 910, 920, 930 extend in the downstream direction. Other embodiments may have other arrangements.

As noted above, the lobes 910, 920, 930 may generally be oval. In one exemplary embodiment, the lobes 910, 920, 930 may have straight sides and be considered curved rectangles. In other exemplary embodiments, the lobes 910, 920, 930 may have curved sides.

The lobes 910, 920, 930 may have any suitable dimensional, including any suitable length 916, 926, 936 along the respective major axis and any suitable width 918, 928, 938 along the respective minor axis. In one exemplary embodiment, the length 916, 926, 936 (measured from the hole axis) of each lobe 910, 920, 930 may be, for example, about 0.035 inches and the width 918, 928, 938 of each lobe may be, for example, about 0.013 inches, although other dimensions may be provided based on engine size, engine characteristics, and cooling requirements. In one exemplary embodiment, the length 916, 926, 936 of the lobes 910, 920, 930 increases as the cooling hole 900 approaches the exterior surface 908 (see FIG. 10) to result in the shape shown in FIG. 9.

Additionally, the lobes 910, 920, 930 may be oriented in any suitable manner relative to one another. In the view of FIG. 9, the first lobe 910 is oriented on one side of the second lobe 920 at a first angle 902, and the third lobe 930 is oriented on the other side of the second lobe 920 at a second angle 904. In one exemplary embodiment, the angles 902, 904 are equal, although in other embodiments, the angles 902, 904 may be different. The angles 902, 904 may be, for example, between about 15° and about 75°, although larger or smaller angles 902, 904 may be provided. In the depicted embodiment, the angles 902, 904 are about 45°, as measured from an outer side to a centerline of the second lobe 920.

The areas between the lobes 910, 920, 930 may be any suitable shape or configuration. As best shown in FIG. 10, in one exemplary embodiment, the areas between the lobes 910, 920, 930 may form lands 940, 942 that extend to the exterior surface 908 of the airfoil. Although the lands 940, 942 extend to the exterior surface 908, in other embodiments, the lands 940, 942 may be recessed relative to the exterior surface and curved between the respective lobes 910, 920, 930.

As noted above, the lengths 916, 926, 936 and widths 918, 928, 938 of the cooling hole 900 may vary. In the embodiment shown of FIG. 9, the length 926 of the second lobe 920 is approximately equal to the lengths 916, 936 of the first and third lobes 910, 930 such that the second lobe 920 generally extend slightly further in a downstream direction than the other lobes 910, 930. However, in other embodiments, other lengths may be provided, such as shown in FIGS. 11 and 12.

Figure 11:
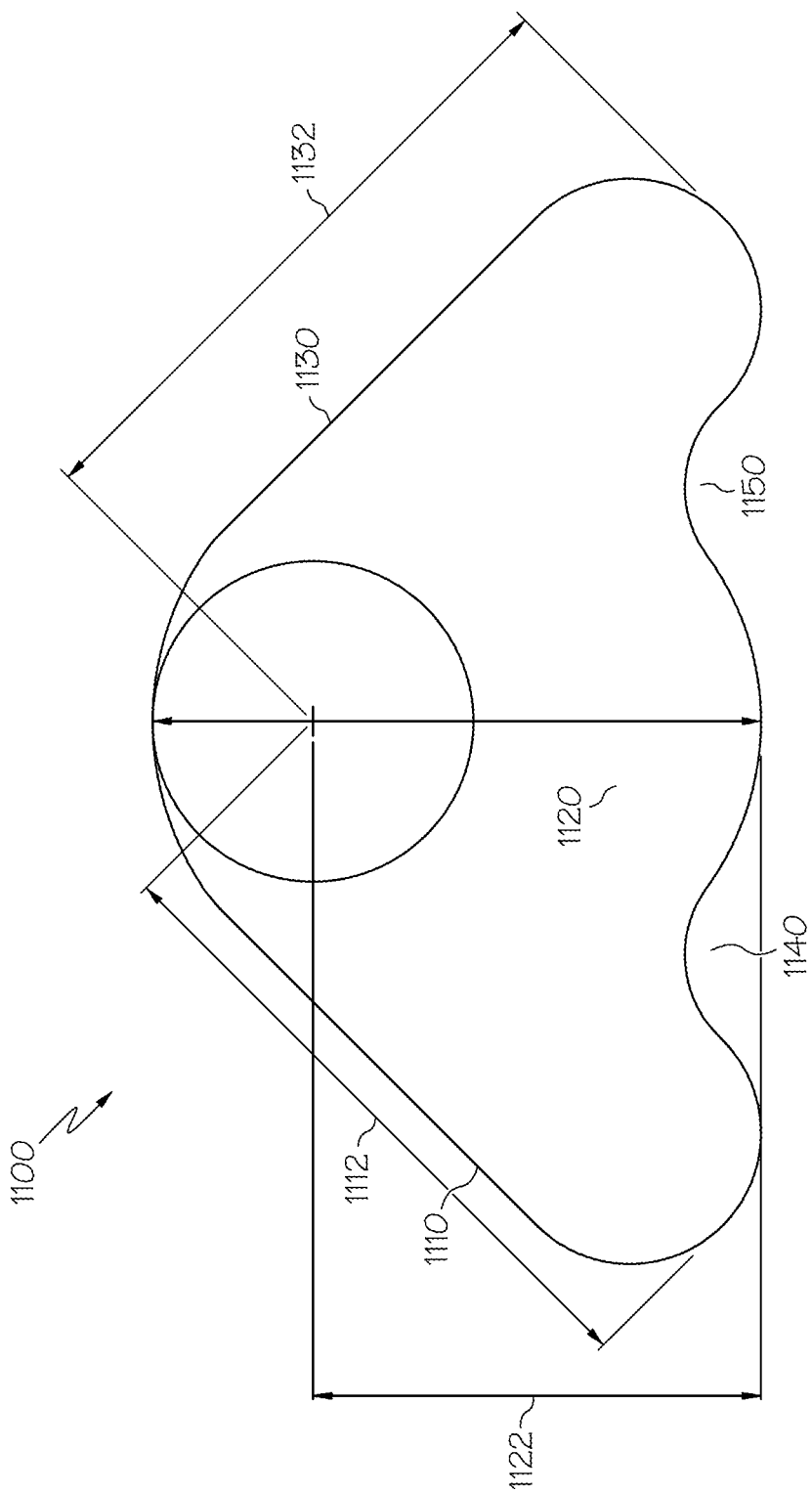
FIG. 11 is an outer surface view of a cooling hole in accordance with an exemplary embodiment.
Figure 12:
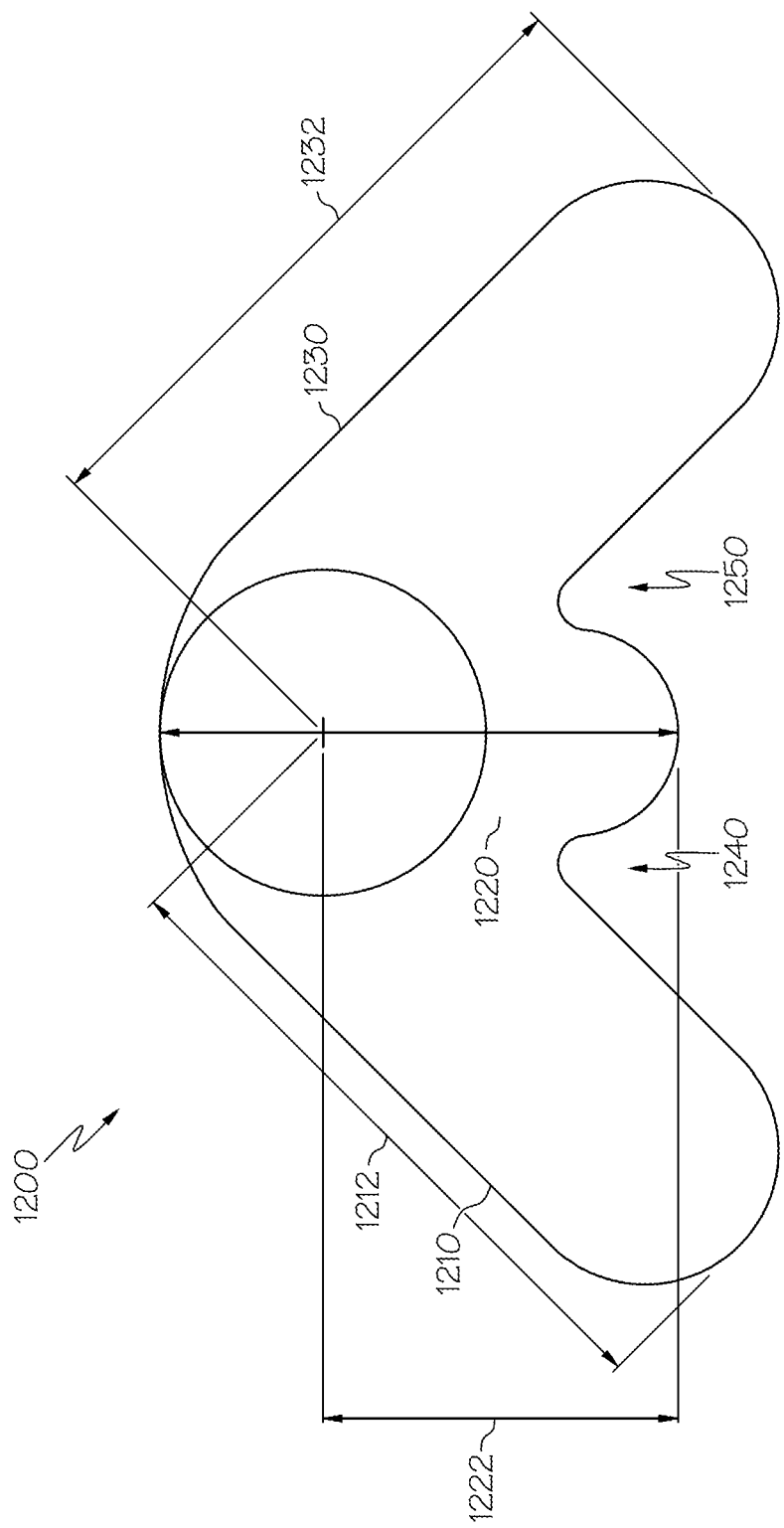
FIG. 12 is an outer surface view of a cooling hole in accordance with an exemplary embodiment.

FIGS. 11 and 12 are outer surface views of cooling holes 1100, 1200 that may be incorporated into engine components in accordance with an exemplary embodiment. In general, the end views of FIGS. 11 and 12 correspond to the view of FIG. 9.

The cooling hole 1100 of FIG. 11 has a tri-lobed shape similar to that of FIG. 9 with a first lobe 1110, a second lobe 1120, and a third lobe 1130. As above, the lobes 1110, 1120, 1130 may have a common end and extend at an angle relative to one another with lands 1140, 1150 formed in between. In contrast to the cooling hole 920 of FIG. 9, the second lobe 1120 has a length 1122 slightly shorter than the lengths 1112, 1132 of the first and third lobes 1110, 1130 such that the three lobes 1110, 1120, 1130 generally terminate in the same downstream location.

The cooling hole 1200 of FIG. 12 has a tri-lobed shape similar to that of FIG. 9 with a first lobe 1210, a second lobe 1220, and a third lobe 1230. As above, the lobes 1210, 1220, 1230 may have a common end and extend at an angle relative to one another with lands 1240, 1250 formed in between. In contrast to the cooling hole 920 of FIG. 9, the second lobe 1220 has a length 1222 that is shorter as the lengths 1212, 1232 of the first and third lobes 1210, 1230. As such, the second lobe 1220 extends a slightly shorter distance than the first and third lobes 1210, 1230 in the downstream direction. FIGS. 11 and 12 illustrate second lobes 1120, 1220 with different lengths than that of the second lobe 920 described with respect to FIG. 9. In general, the lengths of any of the lobes discussed above may be varied based on Computational Fluid Dynamics (CFD) analysis. Such variations may also include hole shape and orientation angle of the lobes relative to streamlines of the external flow.

Figure 13:
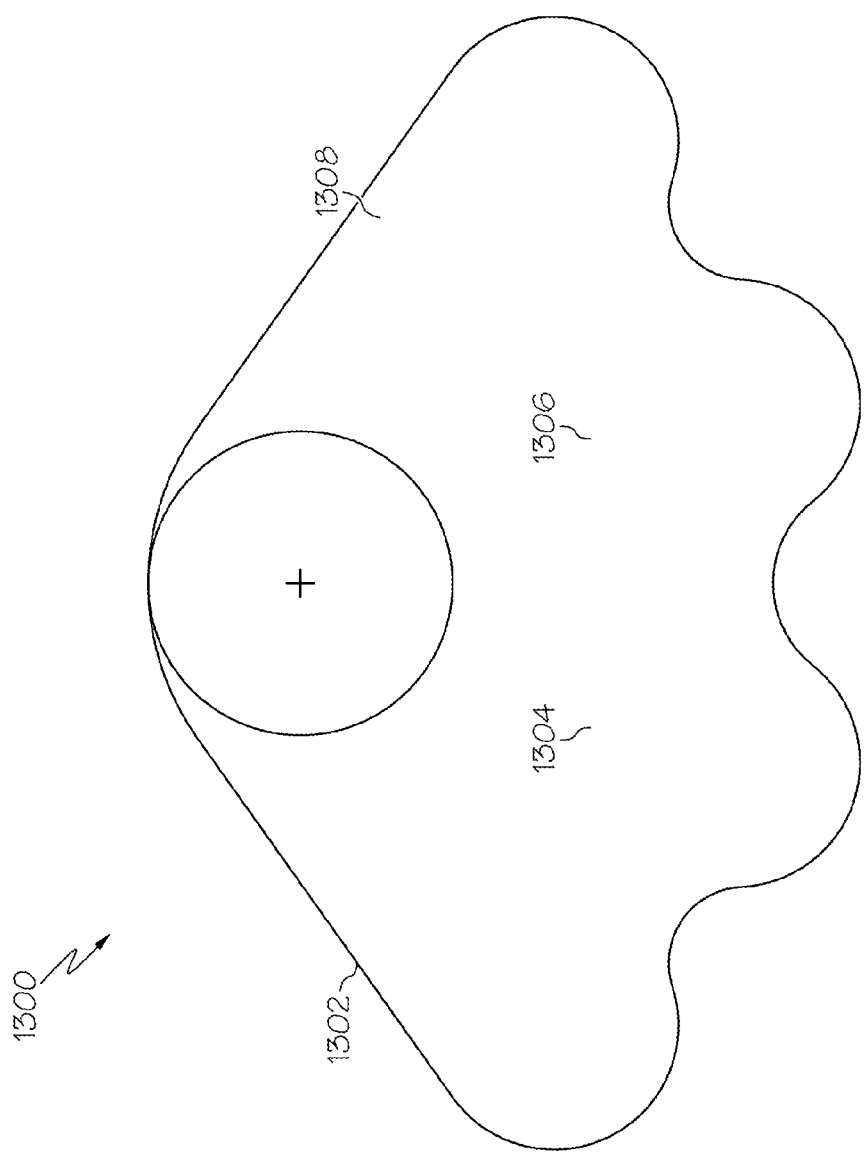
FIG. 13 is an outer surface view of a cooling hole in accordance with an exemplary embodiment.

Although tri-lobed cooling holes 900, 1100, 1200 are described above, exemplary embodiments may be four or more lobes. As an example, FIG. 13 is a top or end view of the downstream portion of the cooling hole 1300 similar to those discussed above. However, the cooling hole 1300 of FIG. 13 includes a first lobe 1302, a second lobe 1304, a third lobe 1306, and a fourth lobe 1308. Additional lobes may be provided.

Figure 14:
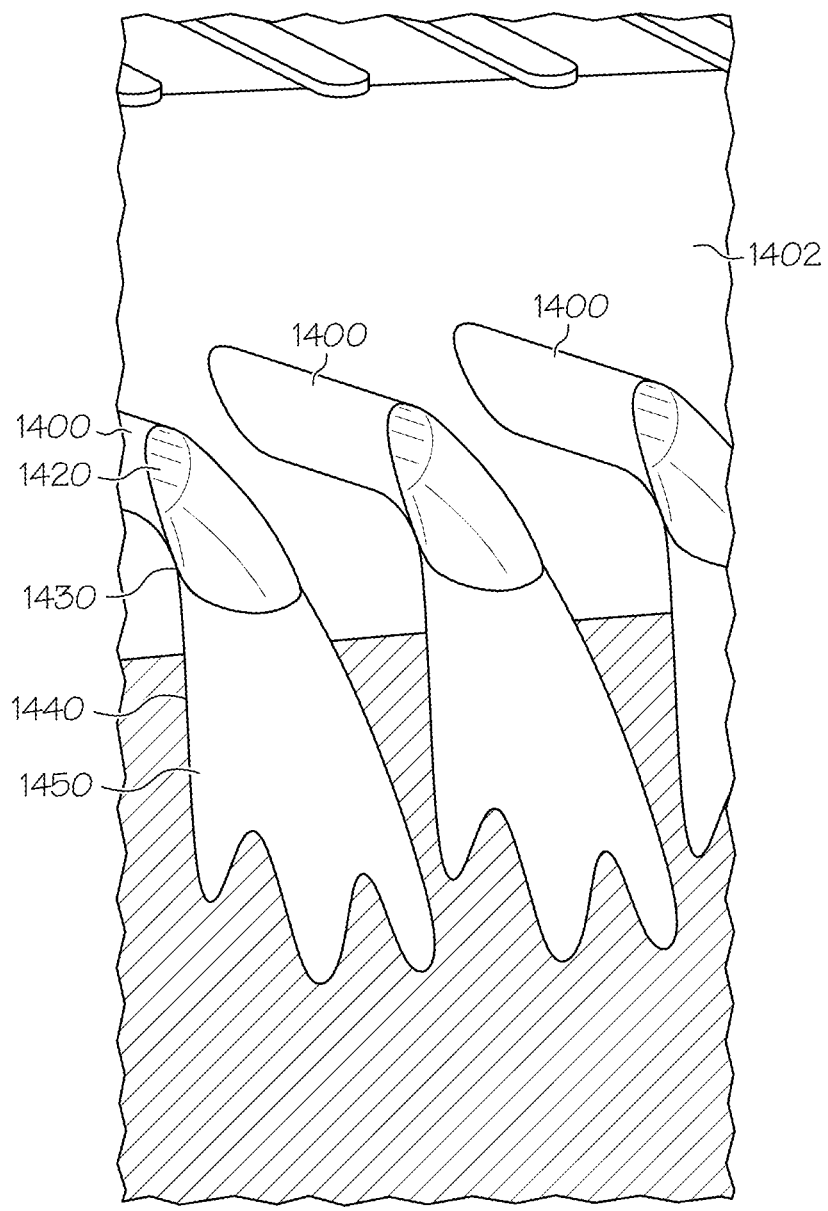
FIG. 14 is an isometric surface view of a portion of an airfoil in accordance with an exemplary embodiment.

In general, any of the cooling holes discussed above may be diffused in a forward direction, such as discussed with reference to FIG. 6. As one example, FIG. 14 is an isometric external view of a series of cooling holes 1400 positioned in an airfoil 1402. In general, the shape of the outlets 1450 of the cooling holes 1400 correspond to the shape of outlet 950 of cooling hole 900 discussed in reference to FIG. 9. As particularly shown in FIG. 14, the cooling holes 1400 are forward diffused such that first exit portions 1430 and second exit portions 1440 transition from an oval metering portion 1420 to the outlet 1450. The second exit portion

1440 has a larger angle than the first exit portion 1450 to enable the forward diffusion. As a result, the cooling air may be placed at previously unavailable locations and/or with previously unavailable characteristics.

In general, the cooling holes discussed above facilitate the distribution of the cooling air substantially completely over the outer surface of an airfoil, e.g. a stator, rotor, or compressor airfoil. In particular, the cross-sectional shapes and configurations of the exemplary cooling holes, both within interior and at the surface, function as forward and lateral diffusers to reduce the velocity and increase static pressure of the cooling airstreams exiting the holes and encourage cooling film development. The holes additionally decrease peak velocities, and improve adiabatic effectiveness across a number of blowing ratios. These airstreams are more inclined to cling to the surface for improved cooling rather than separate from the surface to produce an enhanced cooling effect at the surface. Consequently, exemplary embodiments promote the service life of the airfoil as a result of a more uniform cooling film at the external surfaces.

As a group, the cooling holes may be formed in a selected pattern or array to provide optimum cooling. Computational fluid dynamic (CFD) analysis can additionally be used to optimize the shape, dimensions, locations and orientations of the cooling holes. The cooling holes may be formed by casting, abrasive water jet, Electron Discharge Machining (EDM), laser drilling, additive manufacturing techniques, or any suitable process.

Exemplary embodiments disclosed herein are generally applicable to air-cooled components, particularly those that are to be protected from a thermally and chemically hostile environment. Notable examples of such components include the high and low pressure turbine vanes and blades, shrouds, combustor liners and augmentor hardware of gas turbine engines. The advantages are particularly applicable to gas turbine engine components that employ internal cooling to maintain the service temperature of the component at an acceptable level while operating in a thermally hostile environment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine component, comprising:
a body having an internal surface and an external surface, the internal surface at least partially defining an internal cooling circuit; and
a plurality of cooling holes formed in the body and extending between the internal cooling circuit and the external surface of the body, the plurality of cooling holes including a first cooling hole with forward diffusion and lateral diffusion,
wherein the first cooling hole includes an inlet at the internal cooling circuit, a metering section extending from the inlet, a first exit portion extending from the metering section, a second exit portion extending from the first exit portion, and an outlet defined on the external surface and fluidly coupled to the second exit portion, wherein the metering section is an oval-shaped cylinder,
wherein the first exit portion extends at a first angle relative to the metering section and the second exit portion extends at a second angle relative to the metering section, the second angle being greater than the first angle to provide the forward diffusion,
wherein the outlet is a multi-lobe shape formed by a first oval, a second oval, and a third oval, each oval having a first end and a second end, wherein the first ends of the first oval, the second oval, and the third oval at least partially overlap, and wherein the second ends of the first oval, the second oval, and the third ovals are splayed relative to one another to provide the lateral diffusion.

2. The engine component of claim 1, wherein the first oval extends relative to a first side of the second oval at a third angle, and the third oval extends relative to a second side of the second oval at a fourth angle, and wherein the first oval has a first length, the second oval has a second length, and the third oval has a third length.

3. The engine component of claim 2, wherein the third angle is equal to the fourth angle.

4. The engine component of claim 2, wherein the first length and the third length are approximately equal.

5. The engine component of claim 4, wherein the second length and the first length are approximately equal.

6. The engine component of claim 4, wherein the second length is greater than the first length.

7. The engine component of claim 2, wherein the third angle is different than the fourth angle.

8. The engine component of claim 2, wherein the second length is greater than the first length.

9. The engine component of claim 2, wherein the internal cooling circuit includes an internal passage within the body between the internal surface and the external surface, and wherein the second exit portion of the first cooling hole at the second angle places a downstream edge of the first cooling hole on a portion of the external surface adjacent to the internal passage.

10. An engine component, comprising:
a body having an internal surface and an external surface, the internal surface at least partially defining an internal cooling circuit; and
a plurality of cooling holes formed in the body and extending between the internal cooling circuit and the external surface of the body, the plurality of cooling holes including a first cooling hole with double forward diffusion and double lateral diffusion,
wherein the first cooling hole includes an inlet at the internal cooling circuit, a metering section extending from the inlet, a first exit portion extending from the metering section, a second exit portion extending from the first exit portion, and an outlet defined on the external surface and fluidly coupled to the second exit portion, wherein the metering section is an oval-shaped cylinder,
wherein the first exit portion is curved with a first radius of curvature and the second exit portion is curved with a second radius of curvature, the second radius of curvature being greater than the first radius of curvature to provide the double forward diffusion,
wherein the outlet is defined by a leading edge, a trailing edge, and first and second sides extending between the leading edge and the trailing edge, wherein the first side has leading portion extending from the leading edge at a first angle relative to a longitudinal surface axis and a trailing portion extending from the leading portion at a second angle relative to the longitudinal surface axis, the second angle being greater than the first angle to provide the double lateral diffusion.

11. The engine component of claim 10, wherein the first and second sides are asymmetric relative to one another.

12. An engine component, comprising:
a body having an internal surface and an external surface, the internal surface at least partially defining an internal cooling circuit; and
a plurality of cooling holes formed in the body and extending between the internal cooling circuit and the external surface of the body, the plurality of cooling holes including a first cooling hole with double forward diffusion and double lateral diffusion,
wherein the first cooling hole includes an inlet at the internal cooling circuit, a metering section extending from the inlet, a first exit portion extending from the metering section, a second exit portion extending from the first exit portion, and an outlet defined on the external surface and fluidly coupled to the second exit portion, wherein the metering section is an oval-shaped cylinder,
wherein the first exit portion is curved with a first radius of curvature and the second exit portion is curved with a second radius of curvature, the second radius of curvature being greater than the first radius of curvature to provide the double forward diffusion,
wherein the outlet is defined by a leading edge, a trailing edge, and first and second sides extending between the leading edge and the trailing edge, wherein the first side has leading portion extending from the leading edge at a first angle relative to a longitudinal surface axis and a trailing portion extending from the leading portion at a second angle relative to the longitudinal surface axis, the second angle being greater than the first angle to provide the double lateral diffusion, and
wherein the first angle is approximately 10°-12° and the second angle is approximately 13°-15°.

* * * * *